United States Patent
Beck (10) Patent No.: US 7,815,152 B2
(45) Date of Patent: Oct. 19, 2010

(54) COUPLER FOR CABLE TROUGH (75) Inventor: Ronald A. Beck, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 213 days.

(21) Appl. No.: 11/686,944

(22) Filed: Mar. 15, 2007

(65) Prior Publication Data
US 2008/0197240 A1 Aug. 21, 2008

Related U.S. Application Data (63) Continuation-in-part of application No. 11/677,200, filed on Feb. 21, 2007, now Pat. No. 7,463,809.

(51) Int. Cl.
F16L 3/22 (2006.01)
(52) U.S. Cl. .................. 248/68.1; 248/65; 248/74.4; 174/68.3
(58) Field of Classification Search ............... 248/74.2, 248/74.3, 49, 206.5, 65, 58.1, 67.7, 68.1; 174/68.3
See application file for complete search history.

(56) References Cited

U.S. PATENT DOCUMENTS

| | | | |
|---|---|---|---|
| 2,316,166 A | 4/1943 | Huguelet |
| 2,360,159 A | 10/1944 | Peck |
| 2,741,499 A | 4/1956 | Kussmaul |
| 2,821,154 A | 1/1958 | Tennison, Jr. |
| 2,823,056 A | 2/1958 | DiMeo et al. |
| 2,834,622 A | 5/1958 | Reeves |
| 2,880,887 A | 4/1959 | McClurg |
| 2,891,750 A | 6/1959 | Bergquist |
| 3,022,972 A | 2/1962 | Bunston |
| 3,042,351 A | 7/1962 | Du Bois |
| 3,188,030 A | 6/1965 | Fischer |
| 3,351,699 A | 11/1967 | Merckle |
| 3,370,121 A | 2/1968 | Merckle |

(Continued)

FOREIGN PATENT DOCUMENTS

DE 3636412 A1 4/1988

(Continued)

OTHER PUBLICATIONS

Exhibit A, DITEL, Inc.; DITEL UPL-1000/UPT-1000/Corner Cable Guides; product information, 2 pages, © 1986.

(Continued)

Primary Examiner—J. Allen Shriver, II
Assistant Examiner—Steven M Marsh
(74) Attorney, Agent, or Firm—Merchant & Gould P.C.

(57) ABSTRACT

Elements, couplers, systems, and methods for joining two or more trough members. A locking element for a coupler of a cable trough system includes a frame member including a shaft, a pawl member including first and second ends, and defining an aperture, the shaft of the frame member extending through the aperture so that the pawl member pivots on the shaft, and a member positioned to engage the first end of the pawl member to pivot the pawl member about the shaft into a locked position. When a force is applied to the first end in a direction opposite to that exerted by the member, the pawl member moves about the shaft into an unlocked position.

3 Claims, 12 Drawing Sheets

U.S. PATENT DOCUMENTS

| | | | |
|---|---|---|---|
| 3,457,598 A | 7/1969 | Mariani | |
| 3,471,629 A | 10/1969 | O'Leary | |
| 3,493,917 A | 2/1970 | Glowacz | |
| 3,603,625 A | 9/1971 | Cottrell et al. | |
| 3,782,420 A | 1/1974 | Kolb et al. | |
| 3,875,618 A | 4/1975 | Schuplin | |
| 3,915,420 A | 10/1975 | Norris | |
| 4,099,749 A | 7/1978 | van Vliet | |
| 4,305,236 A | 12/1981 | Williams | |
| 4,854,665 A | 8/1989 | Gagnon | |
| 4,954,015 A | 9/1990 | McGowan | |
| 5,035,092 A | 7/1991 | Brant | |
| 5,038,528 A | 8/1991 | Brant | |
| 5,067,678 A | 11/1991 | Henneberger et al. | |
| 5,078,530 A | 1/1992 | Kim | |
| 5,100,221 A | 3/1992 | Carney et al. | |
| 5,115,541 A | 5/1992 | Stichel | |
| 5,134,250 A | 7/1992 | Caveney et al. | |
| 5,142,606 A | 8/1992 | Carney et al. | |
| 5,161,580 A | 11/1992 | Klug | |
| 5,316,243 A | 5/1994 | Henneberger | |
| D348,651 S | 7/1994 | Henneberger | |
| 5,469,893 A | 11/1995 | Caveney et al. | |
| 5,547,307 A | 8/1996 | Decore et al. | |
| 5,617,678 A | 4/1997 | Morandin et al. | |
| 5,720,567 A | 2/1998 | Rinderer | |
| 5,752,781 A | 5/1998 | Haataja et al. | |
| 5,753,855 A | 5/1998 | Nicoli et al. | |
| 5,792,993 A | 8/1998 | Rinderer | |
| 5,797,575 A | 8/1998 | Clausen | |
| D402,262 S | 12/1998 | Scherer et al. | |
| D402,263 S | 12/1998 | Scherer et al. | |
| D413,306 S | 8/1999 | Scherer et al. | |
| 5,995,699 A | 11/1999 | Vargas et al. | |
| 5,998,732 A | 12/1999 | Caveney et al. | |
| D419,962 S | 2/2000 | Caveney | |
| 6,037,543 A | 3/2000 | Nicoli et al. | |
| D430,543 S | 9/2000 | Rohder | |
| 6,126,122 A | 10/2000 | Ismert | |
| 6,143,984 A | 11/2000 | Auteri | |
| 6,188,024 B1 | 2/2001 | Benito-Navazo | |
| 6,193,434 B1 | 2/2001 | Durin et al. | |
| D447,737 S | 9/2001 | Scherer et al. | |
| 6,402,418 B1 | 6/2002 | Durin et al. | |
| 6,424,779 B1 | 7/2002 | Ellison et al. | |
| 6,450,458 B1 | 9/2002 | Bernard | |
| 6,454,485 B2 | 9/2002 | Holcomb et al. | |
| 6,463,631 B2 | 10/2002 | Noda | |
| 6,476,327 B1 | 11/2002 | Bernard et al. | |
| 6,512,875 B1 | 1/2003 | Johnson et al. | |
| 6,520,192 B1 | 2/2003 | Lo | |
| 6,523,791 B2 | 2/2003 | Bernard et al. | |
| 6,603,073 B2 | 8/2003 | Ferris | |
| 6,634,605 B2 | 10/2003 | Bernard et al. | |
| 6,634,825 B2 | 10/2003 | Tolkoff et al. | |
| 6,709,186 B2 | 3/2004 | Nault et al. | |
| 6,715,719 B2 | 4/2004 | Ferris et al. | |
| 6,810,191 B2 | 10/2004 | Ferris et al. | |
| 6,848,854 B2 * | 2/2005 | Masse | 403/329 |
| 7,029,195 B2 | 4/2006 | Ferris et al. | |
| 7,093,997 B2 | 8/2006 | Ferris et al. | |
| 7,113,685 B2 * | 9/2006 | Ferris et al. | 385/134 |
| 7,175,137 B2 | 2/2007 | Ferris et al. | |
| 7,224,880 B2 * | 5/2007 | Ferris et al. | 385/134 |
| 7,226,022 B2 * | 6/2007 | Bernard et al. | 248/68.1 |
| 7,246,778 B2 | 7/2007 | Caveney et al. | |
| 2002/0006312 A1 | 1/2002 | Buard | |
| 2002/0096606 A1 | 7/2002 | Bernard et al. | |
| 2003/0147690 A1 | 8/2003 | Ronnquist | |
| 2003/0177628 A1 | 9/2003 | Viklund | |
| 2003/0183731 A1 | 10/2003 | Ferris et al. | |
| 2003/0183732 A1 | 10/2003 | Nault et al. | |
| 2004/0142719 A1 | 7/2004 | Jung | |
| 2004/0159750 A1 | 8/2004 | Ferris et al. | |
| 2006/0210356 A1 | 9/2006 | Ferris et al. | |
| 2006/0261240 A1 | 11/2006 | Ferris et al. | |

FOREIGN PATENT DOCUMENTS

| | | |
|---|---|---|
| DE | 102 12 285 A1 | 11/2002 |
| EP | 0 315 023 A2 | 5/1989 |
| EP | 0 571 307 A1 | 11/1993 |
| EP | 0 486 442 B1 | 10/1995 |
| EP | 0 874 260 A1 | 10/1998 |
| EP | 1 033 800 A1 | 9/2000 |
| EP | 1 160 949 A2 | 12/2001 |
| EP | 1 160 950 A2 | 12/2001 |
| EP | 1 249 912 A1 | 10/2002 |
| FR | 1479341 | 5/1967 |
| GB | 549840 | 12/1942 |
| GB | 1 342 085 | 12/1973 |
| WO | 99/06746 | 2/1999 |
| WO | 00/75550 | 12/2000 |
| WO | 02/18991 | 3/2002 |
| WO | 02/31939 | 4/2002 |
| WO | 02/33445 | 4/2002 |
| WO | 02/086576 A1 | 10/2002 |
| WO | 2004/006400 A1 | 1/2004 |

OTHER PUBLICATIONS

Exhibit B, ADC Telecommunications, Inc.; FiberGuide™, Fiber Management System, 6 pages front and back printed, 16/1989.
Exhibit C, Warren & Brown Technologies Pty. Ltd., Fibre Optic Management Systems, Component Selection Guide, 19 pages of product information. Source: www.warrenandbrown.com.au (admitted prior art as of the filing date).
Exhibit D, Panduit Network Connectivity Group, FiberRunner™ 6x4 Routing System Product Brochure, 2 pages, © Panduit Corp. 2000.
Exhibit E, Panduit Corp. FiberRunner™ 4x4 Quiklock™ Coupler (FRBC4X4) Customer Drawing, 1 page, Jul. 13, 2001.
Exhibit F, Panduit Corp. FiberRunner™ 6x4 Quiklock™ Coupler (FRBC6X4) Customer Drawing, 1 page, May 10, 2000.
Exhibit G, Panduit Corp. FiberRunner™ 12x4 Quiklock™ Coupler (FRBC12X4) Customer Drawing, 1 page, Jan. 3, 2001.
Exhibits H-Y, Photographs of various Panduit products (admitted prior art as of the filing date).
U.S. Appl. No. 11/425,605, filed Jun. 21, 2006.
U.S. Appl. No. 11/677,174, filed Feb. 21, 2007.
U.S. Appl. No. 11/677,181, filed Feb. 21, 2007.
U.S. Appl. No. 11/677,184, filed Feb. 21, 2007.
U.S. Appl. No. 11/677,188, filed Feb. 21, 2007.
U.S. Appl. No. 11/677,193, filed Feb. 21, 2007.
U.S. Appl. No. 11/677,203, filed Feb. 21, 2007.

* cited by examiner

COUPLER FOR CABLE TROUGH

RELATED APPLICATIONS

This application is related to the following applications: U.S. patent application Ser. No. 11/677,181; U.S. patent application Ser. No. 11/677,184; U.S. patent application Ser. No. 11/677,188; U.S. patent application Ser. No. 11/677,193; U.S. patent application Ser. No. 11/677,203; and U.S. patent application Ser. No. 11/677,174; all of which were filed on Feb. 21, 2007 and are incorporated by reference herein.

TECHNICAL FIELD

Embodiments disclosed herein relate to systems for the management and routing of telecommunication cables, and, more particularly, to couplers for joining trough members.

BACKGROUND

In the telecommunications industry, optical fiber systems are increasingly used for high-speed signal transmission. With the increased utilization of optical fiber systems, optical fiber cable management requires industry attention.

One area of optical fiber management is the routing of optical fibers from one piece of equipment to another. For example, in a telecommunications facility, optical fiber cables are routed between fiber distribution equipment and optical line terminating equipment. In buildings and other structures that carry such equipment, the cable routing typically takes place in concealed ceiling areas or in other manners to route cables from one location to another.

When routing optical fibers and other cables such as copper wires, it is desirable that a routing system is readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678; 5,316,243; 5,752,781; 6,709,186; and 6,715,719 teach cable routing systems that include a plurality of trough members and couplers.

Various concerns arise with the use of couplers for coupling trough members. One concern is that a plurality of hardware is used for joining the trough members. This hardware can be cumbersome. Further, there is sometimes a need to rearrange or change the trough members and couplers. It is desirable to provide couplers that can be disconnected and reconnected.

SUMMARY

Embodiments disclosed herein relate to a system for the management and routing of telecommunication cables, and, more particularly, to elements, couplers, systems, and methods for joining two or more trough members.

One aspect relates to a locking element for a coupler of a cable trough system, the locking element including a frame member including a shaft, a pawl member including first and second ends, and defining an aperture, the shaft of the frame member extending through the aperture so that the pawl member pivots on the shaft, and a member positioned to engage the first end of the pawl member to pivot the pawl member about the shaft into a locked position. When a force is applied to the first end in a direction opposite to that exerted by the member, the pawl member moves about the shaft into an unlocked position.

DETAILED DESCRIPTION

As used herein, the terms "couple" and "coupled" mean to join or attach a first element in relation to a second element, whether the attachment is made directly with the second element or indirectly through one or more intermediate components. As used herein, the term "slot" means a space defined by one or more surfaces and can include, without limitation, T-slots, closed slots, flanges, and projections.

Figure 1:
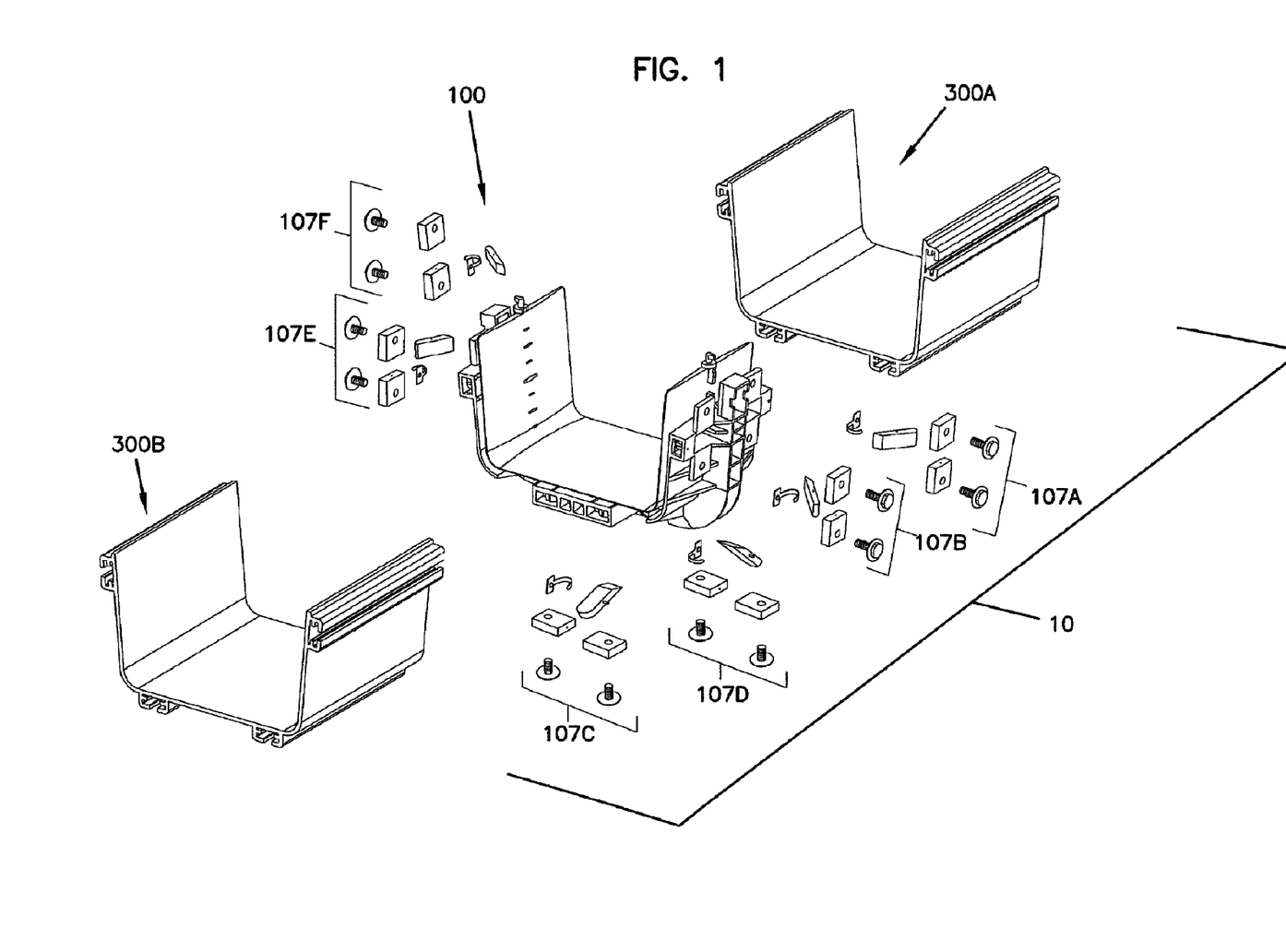
FIG. 1 is a perspective view of an embodiment of a trough system shown in exploded form.

FIG. 1 shows an example trough system 10 including a coupler 100 for interconnecting trough members 300A, 300B. Coupler 100 includes locking elements 107A, 107B, 107C, 107D, 107E, 107F that secure the connection between coupler 100 and trough members 300A, 300B.

In addition, coupler 100 can be configured to release the connections between coupler 100 and trough members 300A, 300B. In an example embodiment, locking elements 107A, 107B, 107C, 107D, 107E, 107F are tool-less (i.e., do not require the use of a separate tool to couple and uncouple trough members 300A, 300B to coupler 100). However, elements requiring one or more auxiliary tools are also within the scope of the present disclosure.

I. Coupler

Figure 2:
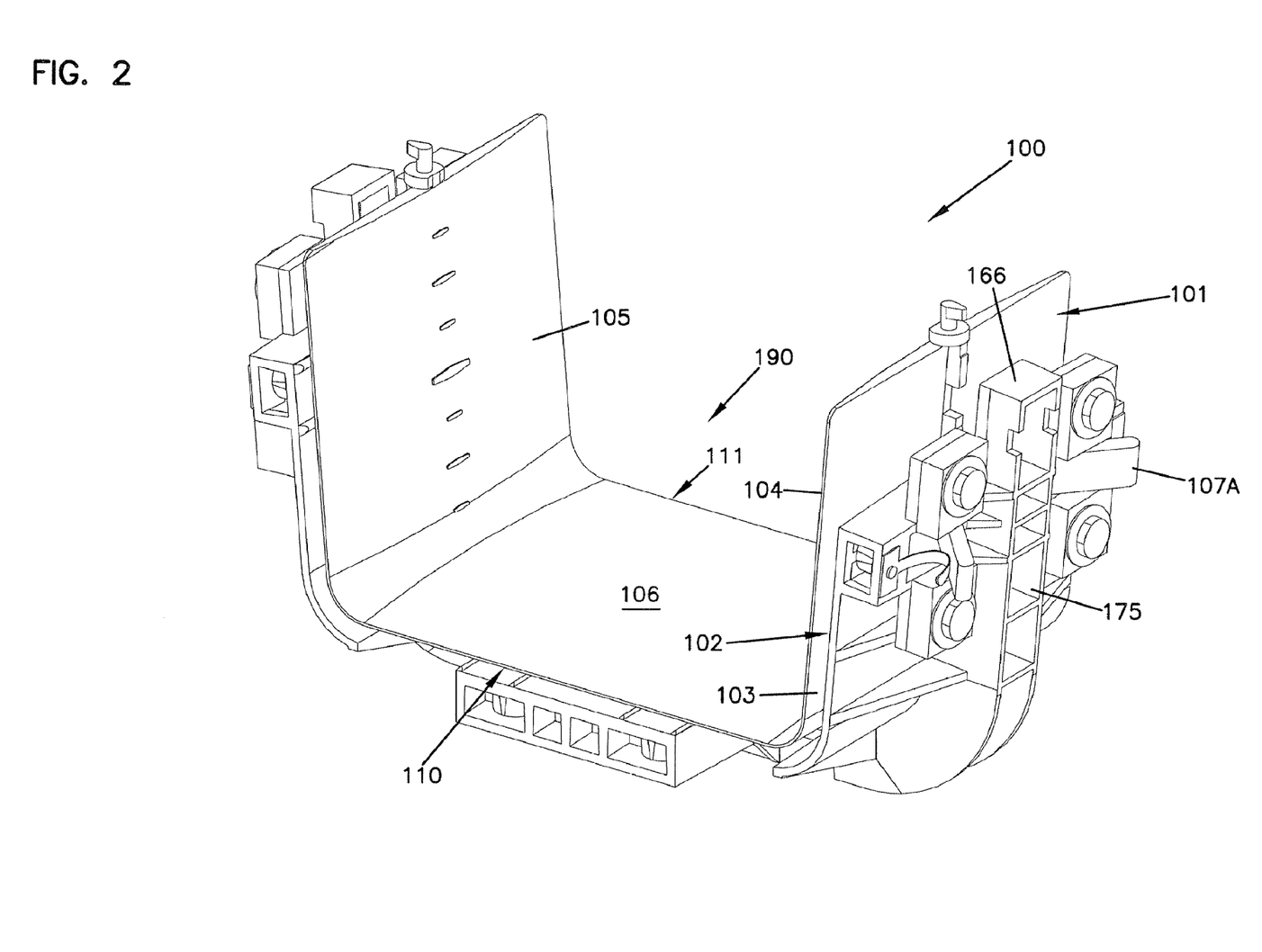
FIG. 2 is a perspective view of an embodiment of a coupler of the trough system of FIG. 1.
Figure 3:
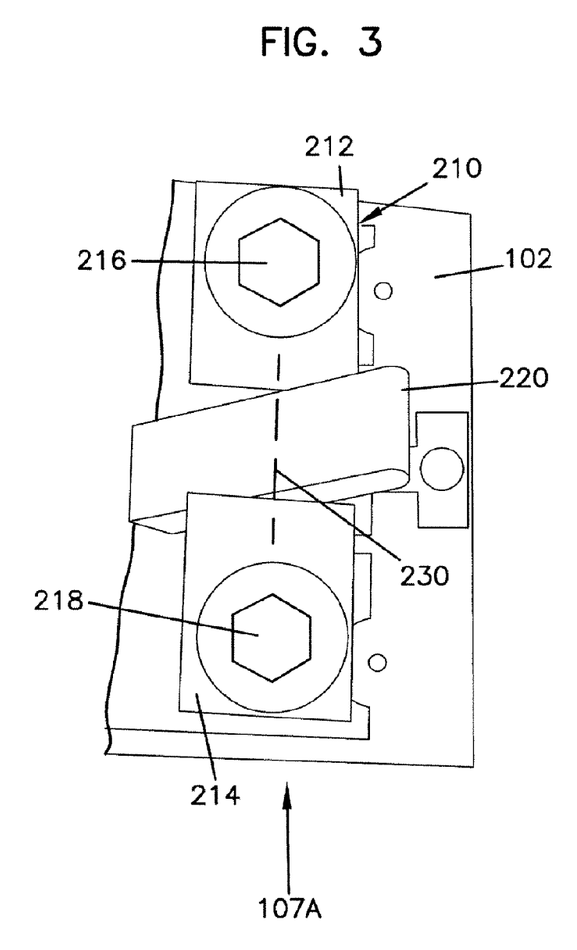
FIG. 3 is a side view of a portion of the coupler of FIG. 2.
Figure 4:
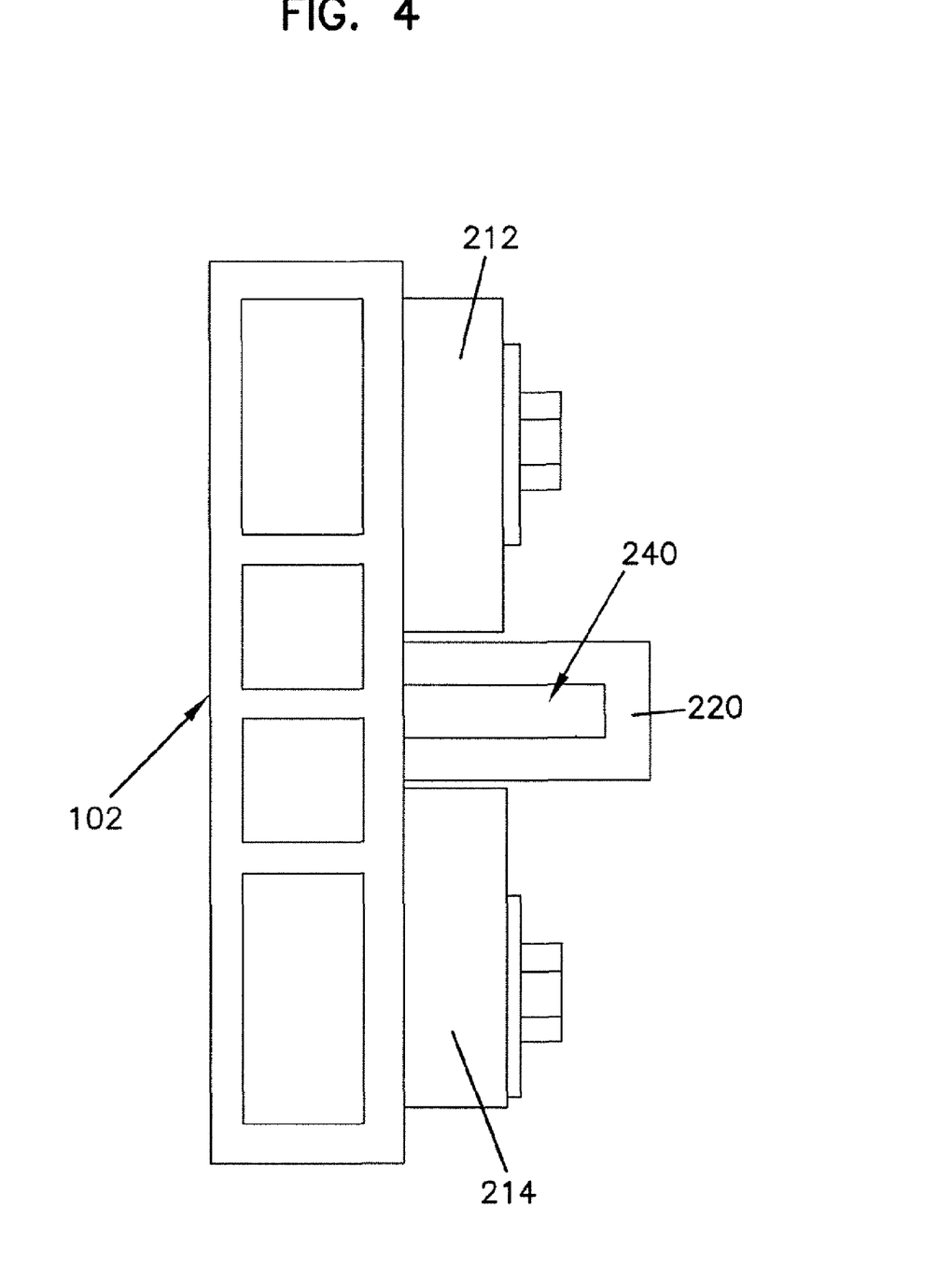
FIG. 4 is an end view of the portion of the coupler of FIG. 3.

As shown in FIG. 2, coupler 100 includes a first guiding surface 101 and a second guiding surface 102 at least partially surrounding first guiding surface 101, as well as a first coupler end 110 and a second coupler end 111. A spacing 103 is defined between first guiding surface 101 and second guiding surface 102. Spacing 103 is sized to receive a trough member (e.g., trough members 300A, 300B) or another trough system component inserted into the spacing 103 in a longitudinal direction 190.

First guiding surface 101 of coupler 100 is generally in the shape of a trough, including a first side wall portion 104 and a second side wall portion 105, as well as a bottom wall portion 106 joining first and second side wall portions 104 and 105. As used herein, the term "trough" means any structure that defines an interior in which an element such as an optical cable can be maintained. Second guiding surface 102 is also in the shape of a trough. A midpoint or midsection 175 divides coupler 100 into first and second halves, and generally surrounds at least a portion of first guiding surface 101. A rib portion 166 is coupled to second guiding surface 102. Locking element 107A is coupled to second guiding surface 102, as described below.

Referring now to FIGS. 2-6, locking element 107A includes a pawl member 220 rotatably coupled to a body 210, and a spring member 240 coupled to body 210.

Body 210 includes frame members 212, 214 that are coupled to second guiding surface 102 of coupler 100. In example embodiments, frame members 212, 214 are coupled to coupler 100 using bolts 216, 218. In alternative embodiments, other fasteners such as screws or adhesives can be used. In yet other embodiments, frame members 212, 214 can be molded as part of second guiding surface 102.

Extending between frame members 212, 214 is a shaft 230. See FIGS. 3, 5, and 6. As described further below, pawl member 220 is positioned on and rotates about shaft 230.

Figure 5:
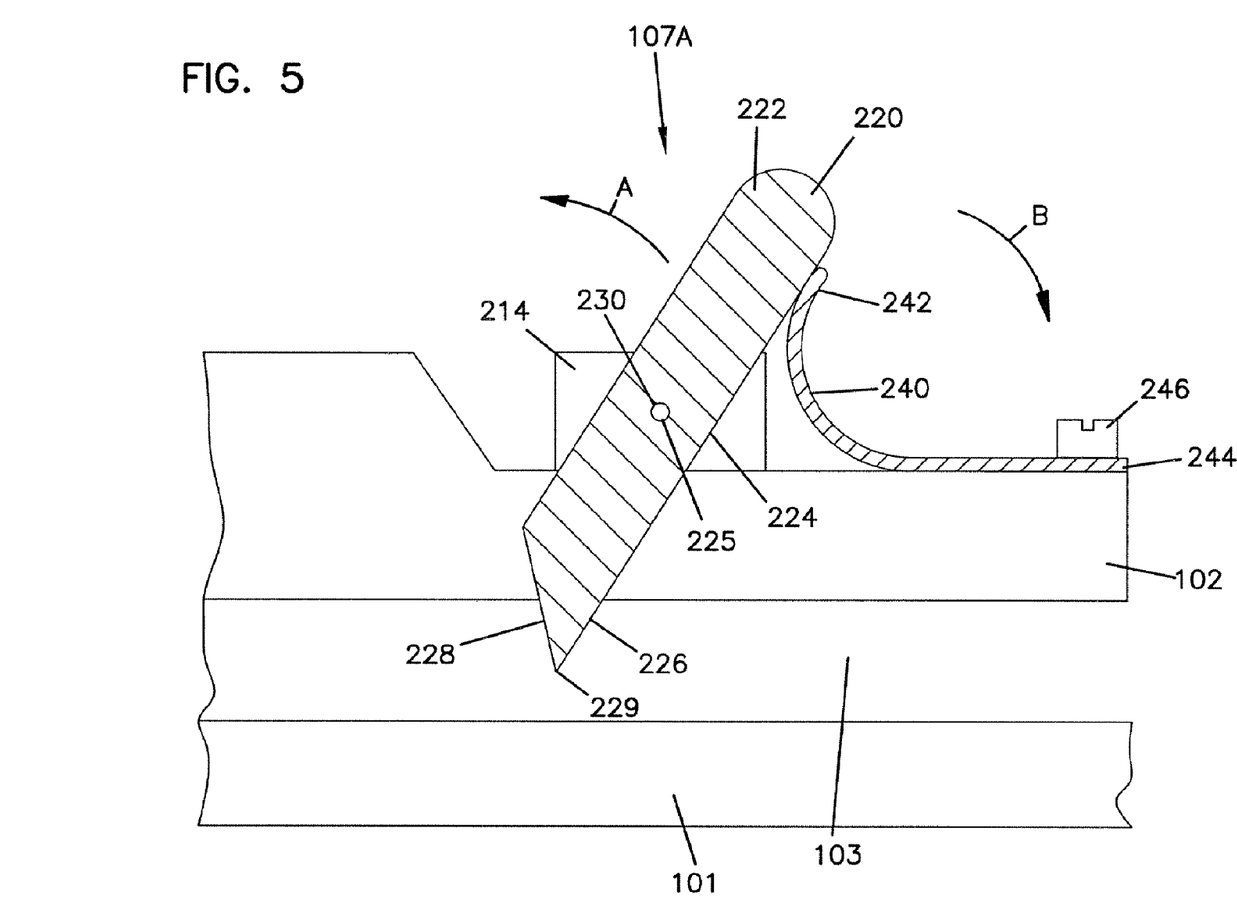
FIG. 5 is a cross-sectional view of the portion of the coupler of FIG. 3 with the locking element in a locked position.
Figure 6:
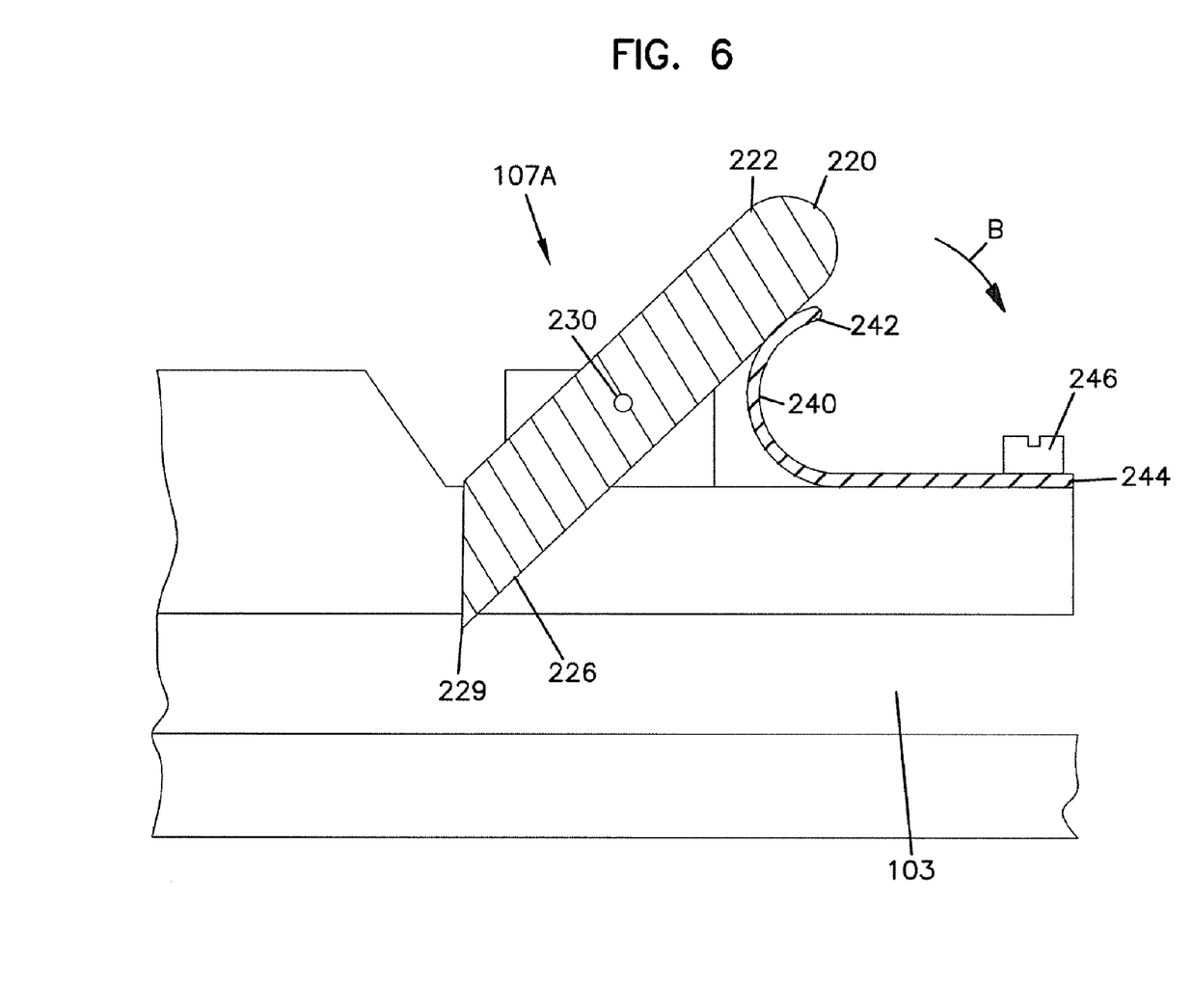
FIG. 6 is another cross-sectional view of the portion of the coupler of FIG. 3 with the locking element in an unlocked position.

Referring now to FIGS. 5 and 6, pawl member 220 includes ends 222, 226 and mid-point 224. Mid-point 224 includes an aperture 225 through which shaft 230 extends. End 226 of pawl member 220 includes a tapered portion 228 that ends in a point 229. As described further below, point 229 extends into and is configured to engage a surface of a trough member that is inserted into spacing 103 formed between first guiding surface 101 and second guiding surface 102 of coupler 100.

Spring member 240 includes an end 242 that engages end 222 of pawl member 220. Another end 244 of spring member 240 is coupled to second guiding surface 102 of coupler 100 using, for example, a screw 246. In the example shown, spring member 240 forms a generally C-shaped configuration, and end 242 can be compressed in a direction B towards end 244.

Other configurations for spring member 240 are possible. For example, in one alternative embodiment, spring member 240 can be a compression spring with coils that extend from end 222 of pawl member 220 to second guiding surface 102.

Pawl member 220 is shown in a locked position in FIG. 5. In the locked position, end 242 of spring member 240 pushes end 222 of pawl member 220 in a direction A so that opposite end 226 of pawl member 220 is forced into spacing 103 of coupler 103. In this position, point 229 is positioned to engage a trough member that is inserted into spacing 103, as described below.

Pawl member 220 can be moved by placing a force on end 222 in direction B again the force exerted by spring member 240, as shown in FIG. 6. As end 222 is forced in direction B, end 242 of spring member 240 is compressed towards end 244, and pawl member 220 pivots about shaft member 230. End 226 of pawl member 220 moves in an opposite direction so that point 229 moves out of spacing 103 so that pawl member 220 is in an unlocked position, as described further below.

In example embodiments, pawl member 220 of locking element 107A can be pivoted without the use of tools (i.e., by hand) so that locking element 107A can be moved from locked to unlocked positions and vice versa. In alternative embodiments, a tool can be used.

II. Trough

Figure 7:
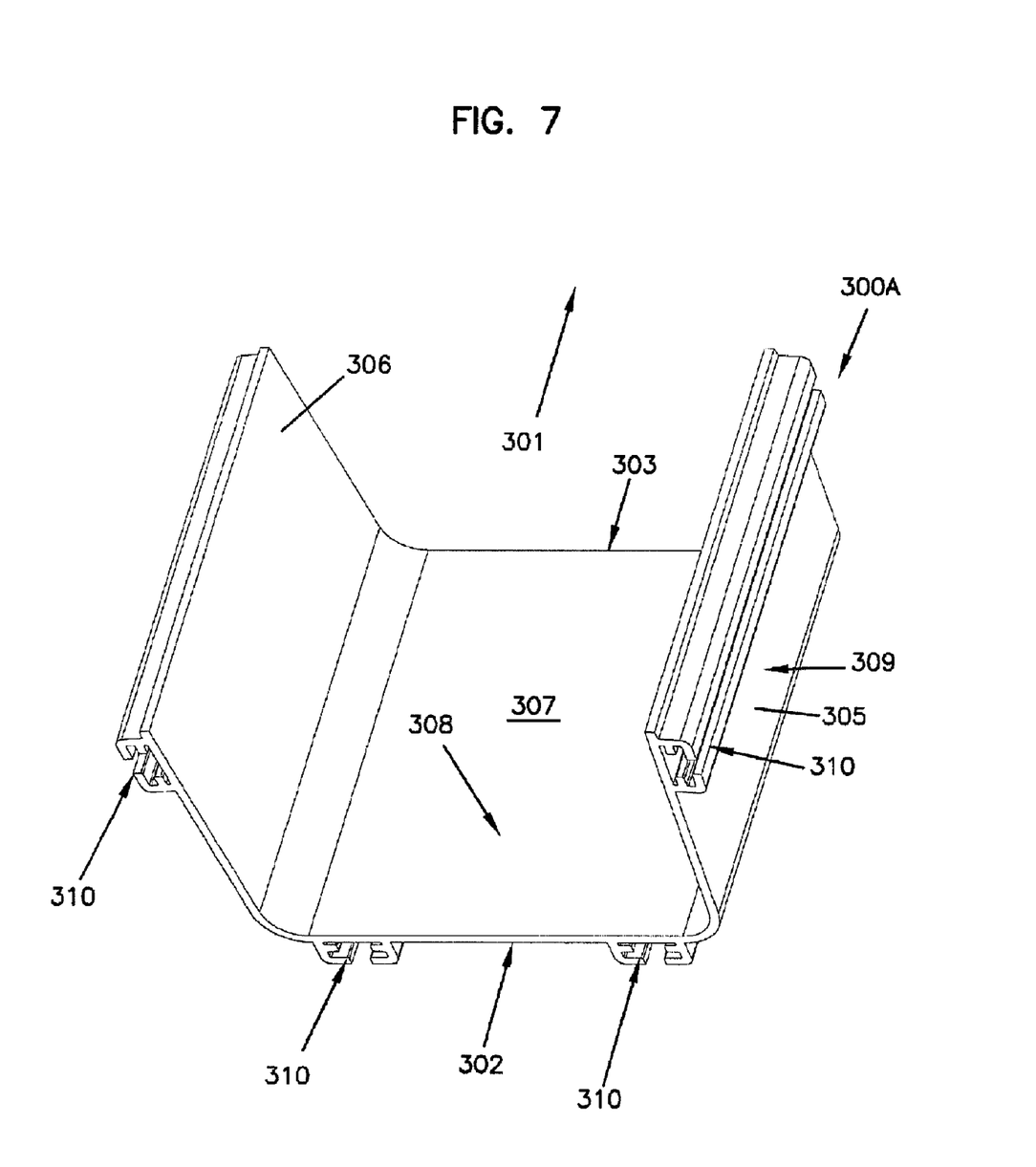
FIG. 7 is a perspective view of a trough member of the trough system of FIG. 1.
Figure 8:
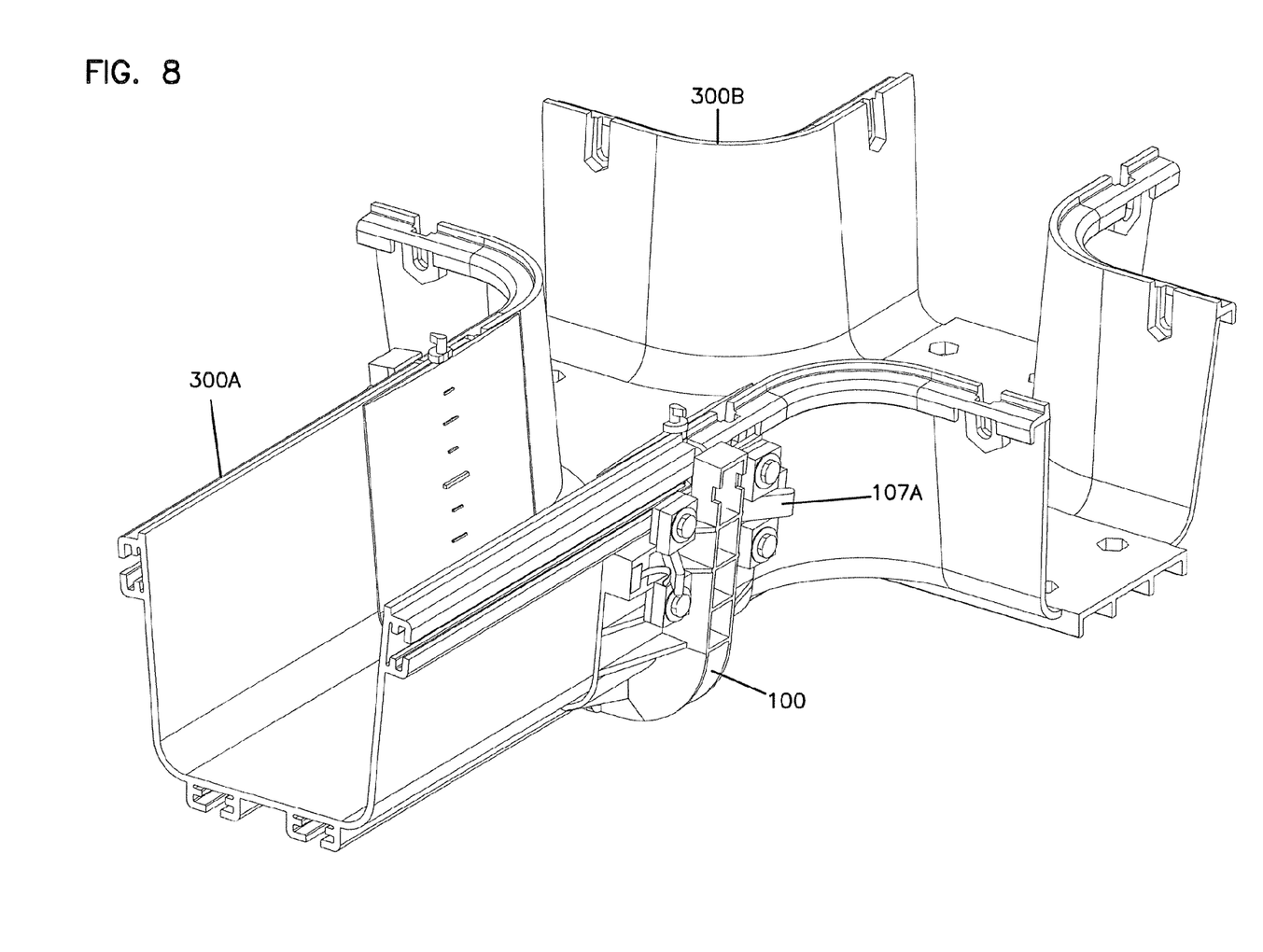
FIG. 8 is a perspective view of another embodiment of a trough system.

Referring now to FIG. 7, trough member 300A is shown in more detail. As used herein, the phrase "trough member" is used to refer to any trough, fitting, railway, raceway, or similarly configured component including any number of ends. Although a specific embodiment of a trough member is shown in and described herein, other trough members can also be used.

Trough member 300A includes a first terminal end 302 and a second terminal end 303. Trough member 300A is generally in the shape of a trough including first and second side walls 305, 306 coupled by a bottom wall 307, thereby defining an interior surface 308 and an exterior surface 309. Walls 305, 306, 307 are each generally planar. In example embodiments, exterior surface 309 of trough member 300A defines one or more slots 310 on the side walls 305 and 306 and bottom wall 307.

III. System

Referring now to FIGS. 8-11, terminal ends 302, 303 of the trough members 300A, 300B are slidingly engaged in a direction C within the spacing 103 between the first and second guiding surfaces 101 and 102 of coupler 100. The thickness of the walls of each of trough members 300A, 300B, or the distance between interior and exterior surfaces 308, 309, are sized to fit within spacing 103 of coupler 100. Coupler 100 overlaps terminal ends 302, 303 of each of trough members 300A, 300B to form the coupling, the overlap defining an overlap region.

Figure 9:
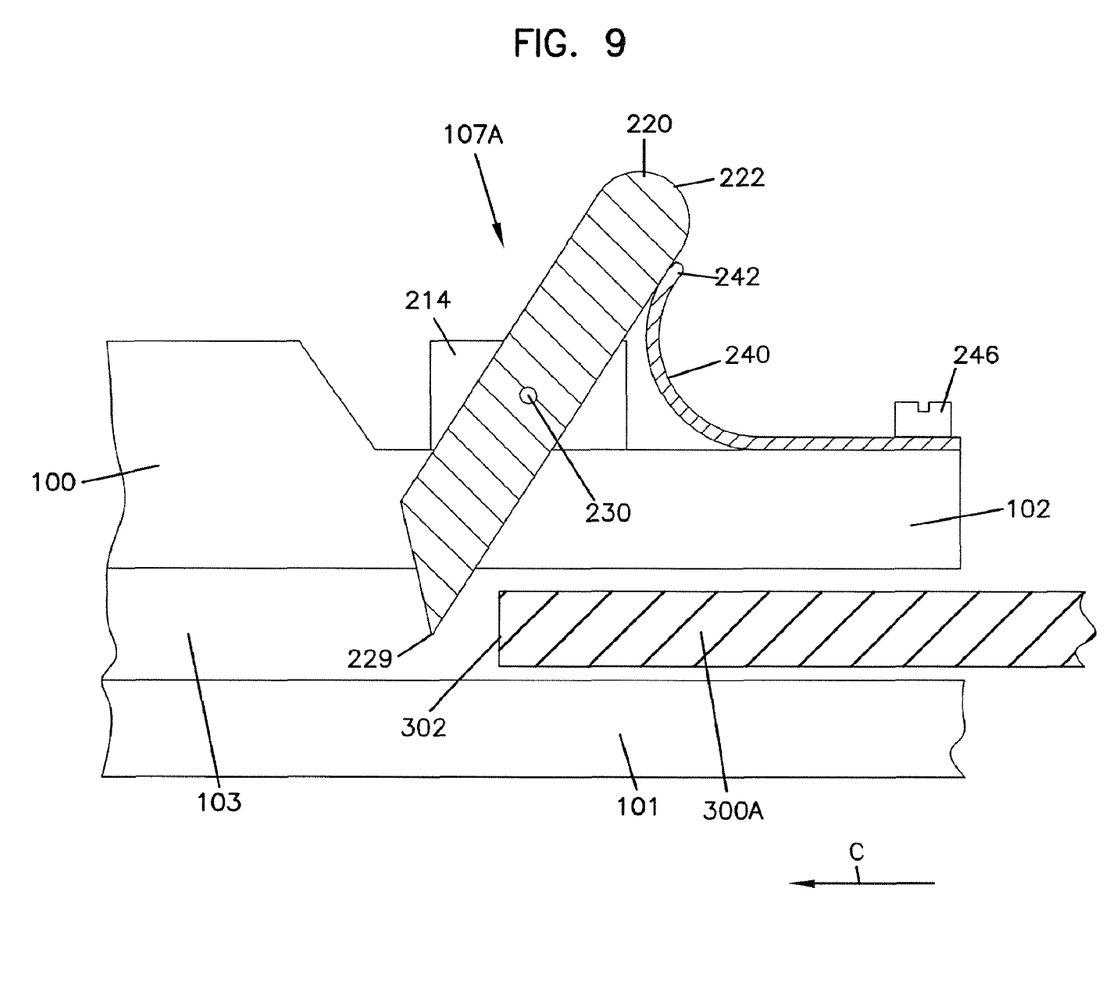
FIG. 9 is a cross-sectional view of a portion of a coupler with a trough member in a partially inserted position and a locking element in a locked position.

Referring now to FIG. 9, locking element 107A is shown in the locked position. In the locked position, point 229 of pawl member 220 extends into spacing 103. As trough member 300A is inserted into spacing 103, trough member 300A contacts pawl member 220 and pawl member 220 pivots slightly about shaft member 230. This allows trough member 300A to ride along point 229 of pawl member 220 until trough member 300A is fully inserted into coupler 100.

Figure 10:
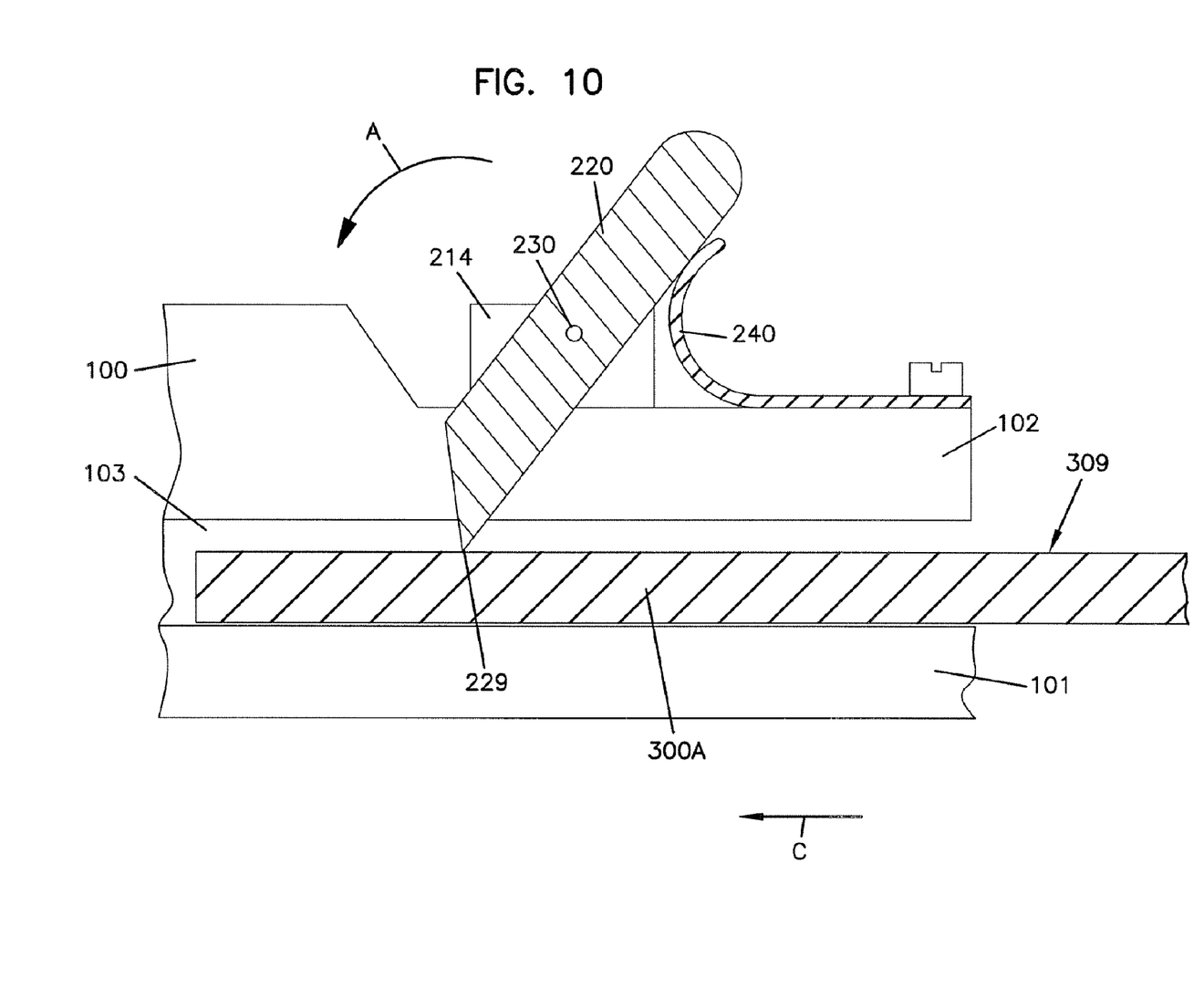
FIG. 10 is another cross-sectional view of the portion of the coupler of FIG. 9 with the trough member in a fully inserted position and the locking element in the locked position.

Referring now to FIG. 10, when trough member 300A is fully inserted into coupler 100, spring member 240 continues to force pawl member 220 in direction A so that point 229 digs into exterior surface 309 of trough member 300A to resist movement of trough member 300A in a direction opposite of direction C out of coupler 100.

Figure 11:
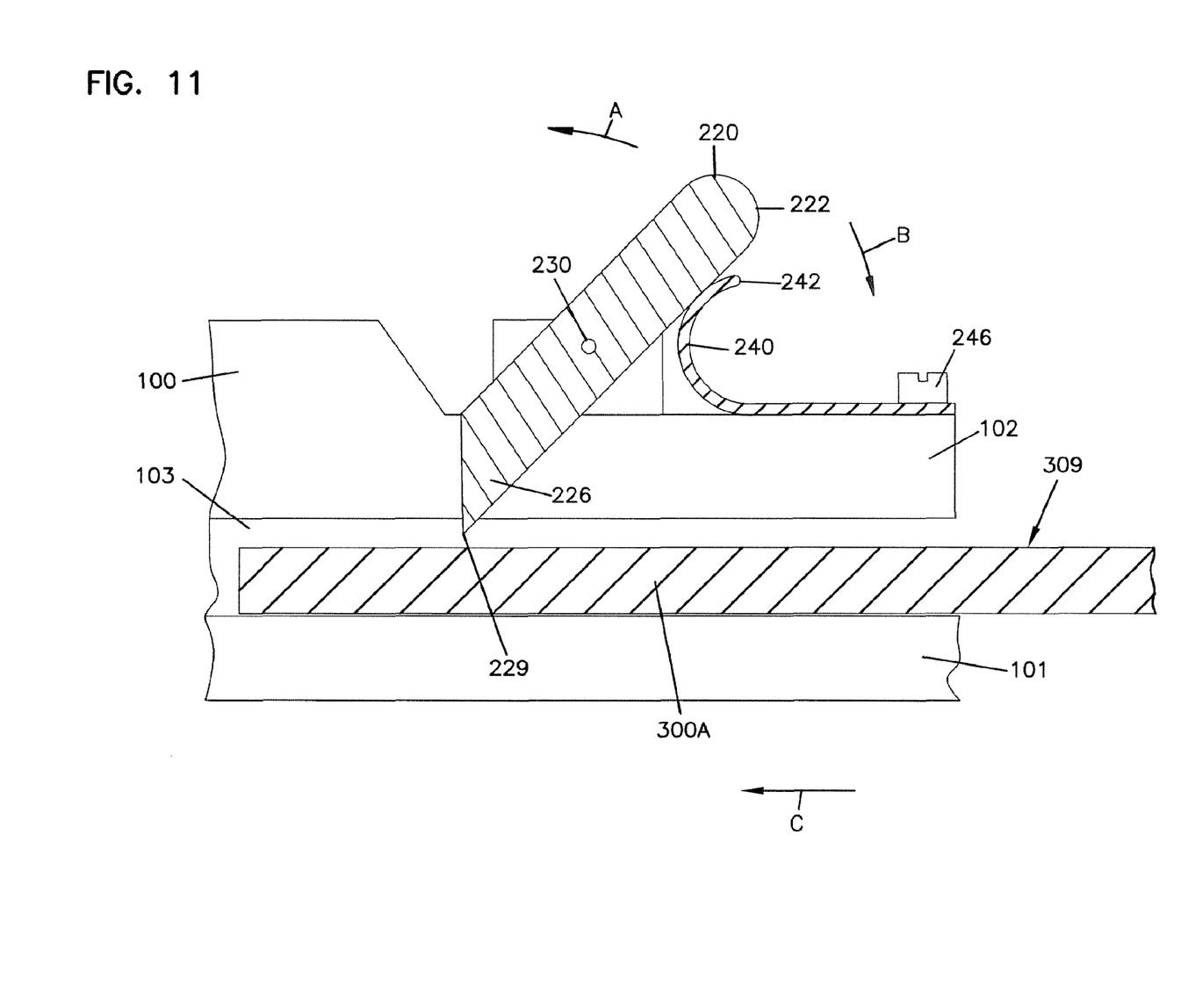
FIG. 11 is a cross-sectional view of the portion of the coupler of FIG. 10 with the locking element in an unlocked position.

As shown in FIG. 11, to release trough member 300A, force is applied to end 222 of pawl member 220 against spring member 240 to move end 222 in direction B. This, in turn, causes pawl member 220 to pivot about shaft member 230 and opposite end 226 of pawl member 220 moves out of spacing 103 into the unlocked position. As point 229 of pawl member 220 moves out of spacing 103, point 229 disengages exterior surface 309 of trough member 300A, and trough member 300A can be removed from coupler 100 in the direction opposite to that of direction C.

When end 222 of pawl member 220 is released, spring member 240 moves pawl member 220 about shaft member 230 back into the locked position.

The other locking elements 107B, 107C, 107D, 107E, 107F function in a manner similar to that of locking element 107A.

IV. Method of Use

An example method for coupling one or both of trough members 300A, 300B to coupler 100 is as follows. Locking element 107A is positioned in the locked position by spring member 240 so that point 229 of pawl member 200 is located with spacing 103 of coupler 100. See, for example, FIG. 9. Terminal end 302 of trough member 300A is then inserted into spacing 103 of coupler 100 in direction C. As trough member 300A is inserted, terminal end 302 contacts and slightly rotates pawl member 220. As terminal end 302 passes point 229 of pawl member 220, point 229 rides along exterior surface 309 of trough member 300A as trough member 300A continues to be inserted into spacing 103.

When trough member 300A is fully inserted into coupler 100, spring member 240 forces pawl member 220 so that point 229 engages exterior surface 309 of trough member 300A. See, for example, FIG. 10. In this locked position, point 229 engages outer surface 309 of trough member 300A to resist movement of trough member 300A out of coupler 100. Trough member 300B can be coupled to second coupler end 111 of coupler 100 in a similar manner.

An example method of removing trough member 300A includes applying force to end 222 of pawl member 220 against spring member 240 to move end 222 in direction B. See FIG. 5. This, in turn, causes pawl member 220 to pivot about shaft member 230 and opposite end 226 of pawl member 220 moves out of spacing 103 into the unlocked position. As point 229 of pawl member 220 moves out of spacing 103, point 229 disengages exterior surface 309 of trough member 300A, and trough member 300A can be removed from coupler 100 in the direction opposite to that of direction C. See FIG. 11. Trough member 300B can be removed in a similar fashion.

In example embodiments, the locking elements disclosed herein are tool-less in that the locking elements do not require a separate tool to move the locking elements from the locked position to the unlocked position and vice versa. For example, in some embodiments, the locking elements can be moved from the locked position to the unlocked position through use of the user's hand.

In example embodiments, the locking elements disclosed herein are auto-locking, in that the locking elements can be placed in the locked position prior to insertion of the trough member into the coupler. When the trough member is introduced into the coupler, the locking elements automatically lock the trough member to the coupler. The locking elements can subsequently be moved to the unlocked position to release the trough member from the coupler.

Figure 12:
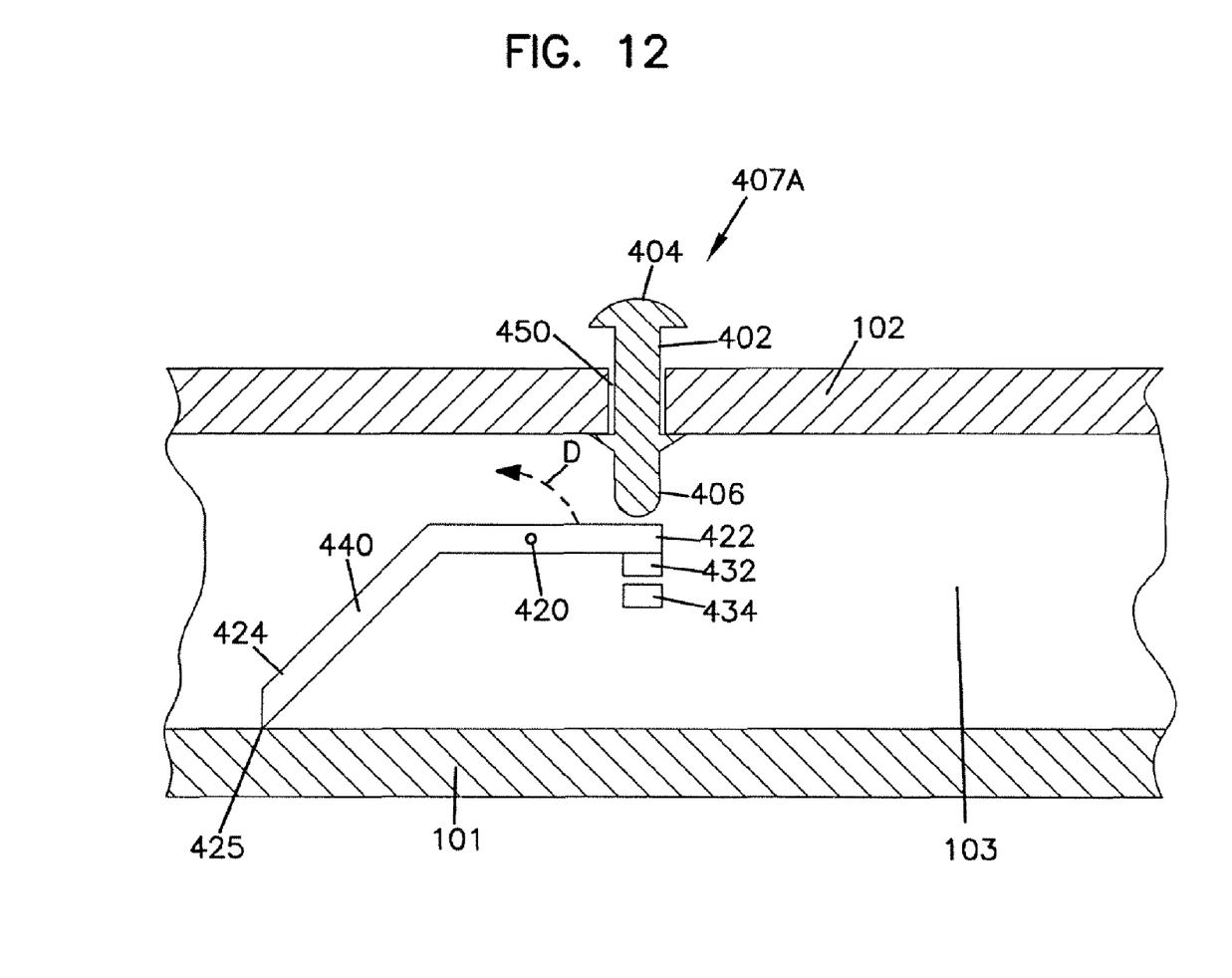
FIG. 12 is a cross-sectional view of a portion of a coupler including another embodiment of a locking element.

Alternative embodiments to those provided herein are also possible. For example, referring now to FIG. 12, another example locking element 407A is shown. Locking element 407A includes a gusset member 402 with ends 404, 406. Gusset member 402 extends through an aperture 450 formed in second guiding surface 102 of coupler 100. A locking member 440 is positioned within spacing 103 and pivots about a shaft 420 in direction D. One end 424 of locking member 440 is forms a point 425 that engages an exterior surface of a trough member that is inserted into spacing 103 of coupler 100. The other end 422 of locking member 440 is coupled to a first magnet 432. A second magnet 434 is fixedly positioned adjacent to first magnet 432. Magnets 432, 434 are of the same polarity so that magnet 434 repels magnet 432. This causes end 422 of locking member 440 to be forced in direction D into a locked position. When force is applied to gusset member 404, end 406 contacts and forces end 422 of locking member 440 in a direction opposite of direction D against the magnetic force of magnet 434 so that locking member 440 moves into an unlocked position. When gusset member 404 is released, the repulsive magnet forces between magnets 432, 434 forces end 422 in direction D so that locking member 440 returns to the locked position.

In other alternative embodiments, a coupler can be configured to be coupled to more than two trough members, therefore including more than the first and second coupler ends. Further, a greater number of locking elements can be presented for each coupler end, or, alternatively, fewer locking elements such as, for example, two on opposing sides, can be used. Other configurations are possible.

The above specification, examples and data provide a complete description of the manufacture and of the invention.

Since many embodiments of the invention can be made without departing from the spirit and scope of the disclosure, the invention resides in the claims hereinafter appended.

What is claimed is:

1. A locking element for a coupler of a cable trough system, the locking element comprising:
   a shaft;
   a locking member including first and second ends, and defining an aperture, the shaft extending through the aperture so that the locking member pivots on the shaft; and
   a member positioned to engage the first end of the locking member to pivot the locking member about the shaft into a locked position;
   wherein, when a force is applied to the first end in a direction opposite to that exerted by the member, the locking member moves about the shaft into an unlocked position;
   wherein the member further includes:
      a gusset member positioned to engage the first end of the locking member;
      a first magnet coupled to the locking member; and
      a second magnet positioned adjacent to the first magnet; and
   wherein, in a first position the gusset member contacts the first end of the locking member to move the member to the unlocked position, and, in a second position, an opposing magnetic force between the first and second magnets moves the locking member to the locked position.

2. A coupler for a cable trough system, the coupler comprising:
   a body including a bottom wall and two side walls defining a trough, the body having a body terminal end defining an overlap region, the overlap region being sized to slideably receive a terminal end of a trough member along a longitudinal direction of the body; and
   a locking element coupled to the body, the locking element including a shaft, a locking member including first and second ends, and defining an aperture, the shaft extending through the aperture so that the locking member pivots on the shaft, and a member positioned to engage the first end of the locking member to pivot the locking member about the shaft into a locked position;
   wherein, when a force is applied to the first end in a direction opposite to that exerted by the member, the locking member moves about the shaft into an unlocked position;
   wherein the member further includes:
      a gusset member positioned to engage the first end of the locking member;
      a first magnet coupled to the locking member; and
      a second magnet positioned adjacent to the first magnet; and
   wherein, in a first position the gusset member contacts the first end of the locking member to move the member to the unlocked position, and, in a second position, an opposing magnetic force between the first and second magnets moves the locking member to the locked position.

3. A cable trough system, comprising:
   a first trough member including a terminal end and an exterior surface;
   a coupler including a body having a body terminal end defining an overlap region, the overlap region being sized to slideably receive the terminal end of the trough member along a longitudinal direction of the body; and a locking element coupled to the body of the coupler, the locking element including:
a shaft;
a locking member including first and second ends, and defining an aperture, the shaft extending through the aperture so that the locking member pivots on the shaft; and
a member positioned to engage the first end of the locking member to pivot the locking member about the shaft into a locked position;
wherein, when a force is applied to the first end in a direction opposite to that exerted by the member, the locking member moves about the shaft into an unlocked position;

wherein the member includes:
a gusset member positioned to engage the first end of the locking member;
a first magnet coupled to the locking member; and
a second magnet positioned adjacent to the first magnet; and
wherein, in a first position the gusset member contacts the first end of the locking member to move the member to the unlocked position, and, in a second position, an opposing magnetic force between the first and second magnets moves the locking member to the locked position.

* * * * *